United States Patent
Osawa et al.

[11] Patent Number: 6,071,443
[45] Date of Patent: Jun. 6, 2000

[54] METHOD OF PRODUCING LENS SHEET AND PROJECTION SCREEN

[75] Inventors: Futoshi Osawa; Masahiro Goto, both of Shinjuku-Ku, Japan

[73] Assignee: Dai Nippon Printing Co., Ltd., Japan

[21] Appl. No.: 09/101,669

[22] PCT Filed: Nov. 27, 1997

[86] PCT No.: PCT/JP97/04325

§ 371 Date: Jul. 15, 1998

§ 102(e) Date: Jul. 15, 1998

[87] PCT Pub. No.: WO98/23978

PCT Pub. Date: Jun. 4, 1998

[30] Foreign Application Priority Data

Nov. 27, 1997 [JP] Japan ................................ 8-316364

[51] Int. Cl.$^7$ .................................................. B29D 11/00
[52] U.S. Cl. ...................... 264/1.36; 264/1.38; 264/1.6; 264/1.7; 427/162
[58] Field of Search .............................. 264/1.6, 1.7, 1.9, 264/2.7, 1.36, 1.38, 1.34; 427/162

[56] References Cited

U.S. PATENT DOCUMENTS 3,689,346  9/1972  Rowland ................................ 156/245
5,410,006  4/1995  Tachibana et al. .

FOREIGN PATENT DOCUMENTS 64-86102    3/1989   Japan .
6-67002     3/1994   Japan .
6-118205    4/1994   Japan .
6-201903    7/1994   Japan .
7-276371   10/1995   Japan .
7-318706   12/1995   Japan .

OTHER PUBLICATIONS

Patent Abstracts of Japan; vol. 015, No. 333 (M–1150); Aug. 23, 1991 & JP 03 128212 A (Mitsubishi Rayon Co Ltd); May 31, 1991 *abstract*.

Primary Examiner—Mathieu D. Vargot
Attorney, Agent, or Firm—Parkhurst & Wendel, L.L.P

[57] ABSTRACT

An object of the present invention is to provide a process for producing a lens sheet, which is safe, which can cut the material cost and the facility cost, which can continuously produce, by the use of a forming die, a formed lens sheet that contains no air bubbles in the lens area thereof and which can attain higher productivity, and reduction of costs by using a decreased number of forming dies or the like; and a projection screen. The process for producing a lens sheet according to the present invention includes the steps of coating a resin composition for a lens sheet onto a forming die by the use of a multiple nozzle in which a plurality of nozzles are arranged at intervals along the forming die for a lens sheet in a direction substantially rectangular to a direction in which the resin composition for a lens sheet will be coated, and superposing a base material on the resin composition for a lens sheet which has been coated onto the forming die.

7 Claims, 4 Drawing Sheets

METHOD OF PRODUCING LENS SHEET AND PROJECTION SCREEN

TECHNICAL FIELD

The present invention relates to a process for producing a lens sheet such as a circular Fresnel lens sheet, and to a projection screen for a rear-projection-type or front-projection-type television, utilizing a lens sheet produced by the production process.

BACKGROUND ART

In general, lens sheets for use in projection screens, especially circular Fresnel lens sheets are formed by a pressing or casting method. However, these two production methods are long in production time, so that they have had the problems of low productivity and high production cost.

Japanese Patent Laid-Open Publication No. 9301/1991 describes, as a means for solving the aforementioned problems, a process for producing a lens sheet, comprising the steps of coating a first ionizing radiation curable resin onto the entire surface of a forming die in the shape of a flat plate; forming a resin bank of a second ionizing radiation curable resin on the first ionizing radiation curable resin; and superposing a laminating base material on the second ionizing radiation curable resin, and uniformly laying the second ionizing radiation curable resin over the first ionizing radiation curable resin with forcing out, by the use of a pressure roll, those air bubbles that enter between the base material and the forming die.

In the process described in the above Japanese Patent Laid-Open Publication No. 9301/1991, it is necessary to use, as the first ionizing radiation curable resin, a resin having a decreased viscosity prepared by diluting the second ionizing radiation curable resin; a resin having a decreased viscosity prepared by heating the second ionizing radiation curable resin to a high temperature; another resin having a low viscosity; or the like, in order to promote deaeration in the step that comes after the step of coating the first ionizing radiation curable resin.

However, if a solvent is used for diluting the second ionizing radiation curable resin, the problem of safety occurs, and it becomes necessary to add the drying step. Further, in the case where the second ionizing radiation curable resin is heated to a high temperature, it is necessary to install a heater or the like; and, in addition, such a problem occurs that resin components are changed as a result of the evaporation of monomer components contained in the resin. Furthermore, when another resin having a low viscosity, containing excessive monomers is used, a lens in the desired shape cannot be obtained due to cure shrinkage; and such a problem occurs that adjustment of refractive index is required between the first and second ionizing radiation curable resins.

DISCLOSURE OF THE INVENTION

We found that, when a resin composition for a lens sheet is coated onto a forming die by the use of a multiple nozzle in which a plurality of nozzles are arranged at intervals along a forming die for a lens sheet in a direction substantially rectangular to a direction in which the resin composition for a lens sheet will be coated, the resin composition for a lens sheet can readily spread over the entire surface of the forming die, so that a lens sheet containing no air bubbles in the lens area thereof can be obtained without using a solvent.

The present invention was accomplished on the basis of this finding. An object of the present invention is to provide a process for producing a lens sheet, which is safe, which can cut the material cost and the facility cost, which can continuously produce, by the use of a forming die, a formed lens sheet that contains no air bubbles in the lens area thereof and which can attain higher productivity, and reduction of costs by using a decreased number of forming dies or the like; and a projection screen.

A first aspect of the present invention is a process for producing a lens sheet, comprising the steps of coating a resin composition for a lens sheet onto a forming die for a lens sheet by the use of a multiple nozzle in which a plurality of nozzles are arranged at intervals along the forming die in a direction substantially rectangular to a direction in which the resin composition for a lens sheet will be coated; and superposing a base material on the resin composition for a lens sheet which has been coated onto the forming die.

A second aspect of the present invention is a process for producing a lens sheet, comprising the steps of coating a resin composition for a lens sheet onto a forming die for a lens sheet by the use of a multiple nozzle in which a plurality of nozzles are arranged at intervals along the forming die in a direction substantially rectangular to a direction in which the resin composition for a lens sheet will be coated; forming a resin bank having the same composition as that of the resin composition for a lens sheet; and superposing a base material on the resin bank, and uniformly laying the resin bank over the resin composition for a lens sheet which has been coated as described above, by leveling the resin bank by applying pressure on top of the base material by the use of a pressure roll.

A third aspect of the present invention is a projection screen, comprising a lens sheet produced by the process for producing a lens sheet according to the above-mentioned first or second aspect of the present invention.

In the aforementioned first and second aspects of the present invention, it is preferable that the forming die be in the shape of a roll and that the base material be continuously fed to the forming die. Further, the resin composition for a lens sheet preferably comprises an ionizing radiation curable resin; and the base material preferably has transparency or light-diffusivity so that ionizing radiation can pass through it. Furthermore, the resin composition for a lens sheet preferably contains a fluorine-containing surface active agent so that it can form a contact angle of 20° or less with the forming die when it is coated onto the forming die. In addition, it is preferable that the nozzles in the multiple nozzle be arranged at intervals of 10 mm or less.

According to the first and second aspects of the present invention, since the resin composition for a lens sheet is coated onto the forming die by the use of the multiple nozzle, and since the resin composition for a lens sheet which preferably contains a fluorine-containing surface active agent is coated onto the forming die so that the resin composition will form a contact angle of 20° or less with the forming die, it is possible to produce a lens sheet without suffering from inclusion of air bubbles by leveling, by the use of a pressure roll, the resin composition for a lens sheet which has been coated onto the forming die, through the base material superposed on the resin composition for a lens sheet.

Further, it becomes possible to use, as the resin composition for a lens sheet (first resin) to be coated by the multiple nozzle, a resin composition whose composition is the same as that of the resin bank (second resin) which will be leveled on this resin composition for a lens sheet, so that it is not necessary, unlike in the conventional production processes, to make the viscosity of the first resin low in order to prevent air bubbles from entering into the forming die. Therefore, the problem of safety, which occurs when the resin composition is diluted with a solvent in order to decrease the viscosity of the resin composition; the problem that the facility cost is increased, which occurs when a heater or the like is installed in order to heat the resin composition to a high temperature; those problems that cure shrinkage is caused and that adjustment of refractive index is required, which will occur when the composition of the first resin and that of the second resin are made different from each other; and the like never occur. For this reason, it is possible to produce a lens sheet safely and easily, and, moreover, to cut both the material cost and the facility cost.

Furthermore, when the forming die is shaped into a roll, it becomes possible to produce a lens sheet continuously, so that it is possible to drastically increase productivity. In addition, since it is not necessary to provide a plurality of forming dies, it is possible to considerably cut the costs required for materials and forming dies.

BEST MODE FOR CARRYING OUT THE INVENTION

By referring now to the accompanying drawings, an embodiment of the present invention will be described hereinafter. FIGS. 1 to 7 are to explain one embodiment of the process for producing a lens sheet according to the present invention.

Figure 1:
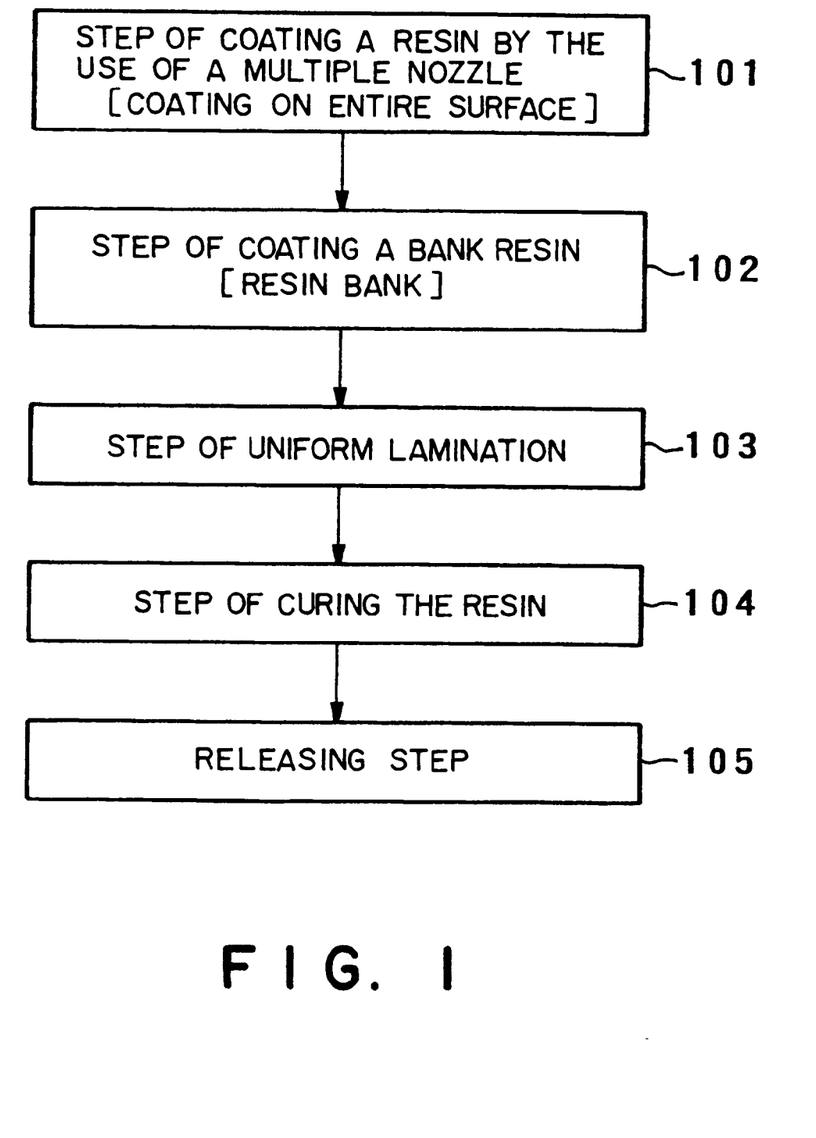
FIG. 1 is a diagram for explaining one embodiment of the process for producing a lens sheet according to the present invention.

As shown in FIG. 1, the process for producing a lens sheet according to this embodiment comprises the step of coating, as the resin composition for a lens sheet, an ionizing radiation curable resin onto the entire surface of a forming die on which a pattern of a lens such as a circular Fresnel lens is formed, by the use of a multiple nozzle in which a plurality of nozzles are arranged at predetermined intervals (step 101), the step of forming, on one end of the forming die, a resin bank having the same composition as that of the ionizing radiation curable resin composition (step 102), the step of superposing a base material on the resin bank, and uniformly laying the resin bank over the ionizing radiation curable resin which has been coated, by leveling the resin bank by applying pressure on top of the base material by the use of a pressure roll (step 103), the step of applying ionizing radiation to the ionizing radiation curable resin through the base material to cure the resin (step 104), and the step of releasing the ionizing radiation curable resin from the forming die (step 105).

Figure 2:
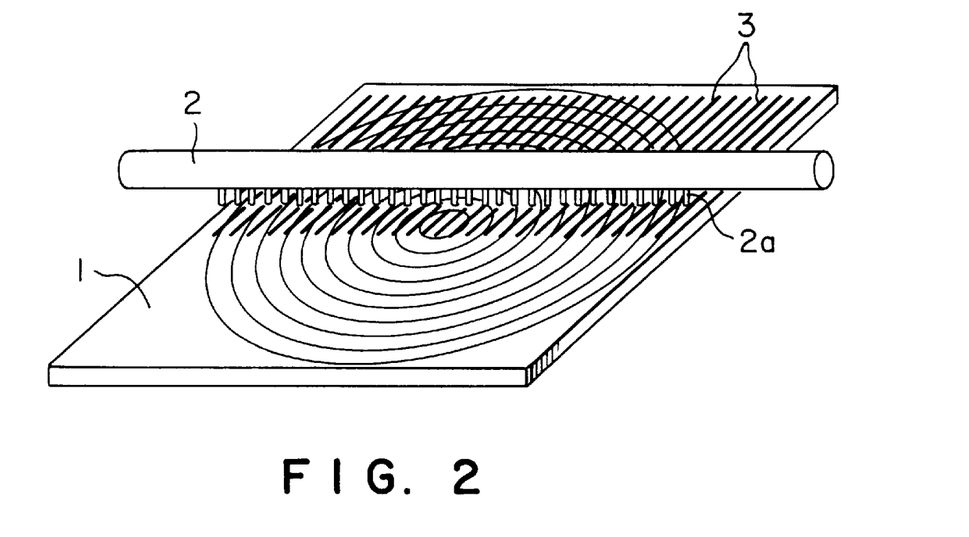
FIG. 2 is an explanatory view of the first step (the step of coating a resin by the use of a multiple nozzle) of the process for producing a lens sheet shown in FIG. 1.

First of all, the step of coating a resin by the use of a multiple nozzle (step 101) shown in FIG. 1 will be explained by referring to FIG. 2. As shown in FIG. 2, the step of coating a resin by the use of a multiple nozzle (step 101) is a step in which an ionizing radiation curable resin composition 3 is coated onto the entire surface of a forming die 1 on which a pattern of a lens such as a circular Fresnel lens is formed, by the use of a multiple nozzle 2 in which a plurality of nozzles 2a are arranged at predetermined intervals along the forming die in the transverse direction thereof (in the direction substantially rectangular to the direction in which the ionizing radiation curable resin 3 will be coated). This step is a step for preventing inclusion of bubbles in the next step, by allowing the ionizing radiation curable resin 3 applied by the multiple nozzle 2 to spread over the forming die 1 to cover the lens area of the forming die 1.

As coating methods other than this multiple nozzle coating method, there have been known the die head coating method and the spray nozzle coating method. However, in the die head coating method, neck-in tends to be caused at the end of a coater, so that it is necessary to make the clearance between a die head and a forming die small. For this reason, it becomes necessary to take even the accuracy of the thickness of the forming die into consideration. The die head coating method is thus unfavorable. Further, in the spray nozzle coating method, it is necessary to make the viscosity of a resin low, so that the coated resin tends to contain bubbles. The spray nozzle coating method is thus unfavorable. In contrast to this, in the multiple nozzle coating method, it is possible to attain stable coating even if the clearance between a multiple nozzle and a forming die is made relatively large, and, in addition, the coated resin is free from inclusion of bubbles.

Figure 7:
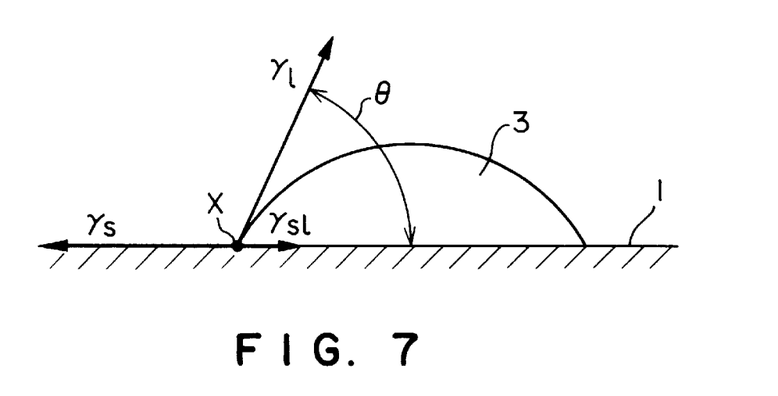
FIG. 7 is an explanatory view of the contact angle formed by a resin composition for a lens sheet and a forming die.

It is preferable to prepare the ionizing radiation curable resin 3 so that it will form a contact angle of 20° or less with the forming die 1 when it is coated onto the forming die 1 (see FIG. 7). It is therefore preferable to add a fluorine-containing surface active agent to the ionizing radiation curable resin 3. It is noted that the contact angle θ is defined as the angle formed by the tangent $_1$ along the outer surface of the ionizing radiation curable resin 3 drawn at the point of contact (see symbol X) of the outer surface of the ionizing radiation curable resin 3 with the forming die 1, and the line $_{s1}$ drawn from X to the inside of the ionizing radiation curable resin 3 along the surface of the forming die 1. Even if the contact angle θ is 20° or more, it is possible to prevent inclusion of air bubbles by coating a large amount of the ionizing radiation curable resin 3 onto the entire surface of the forming die 1. However, the excessively coated portion of the ionizing radiation curable resin 3 is wasted, so that such a manner is unfavorable.

It is preferable to add 0.1 to 0.5% (% by weight) of a fluorine-containing surface active agent to the ionizing radiation curable resin 3. When a fluorine-containing surface active agent is added in an amount of 0.1% or less, the contact angle cannot be 20° or less, and inclusion of air bubbles is caused. Such an amount is thus unfavorable. On the other hand, even if a fluorine-containing surface active agent is added in an amount of 0.5% or more, the effect of decreasing the contact angle θ cannot be obtained correspondingly to the amount of the surface active agent added. Further, it is unfavorable to add a large amount of a fluorine-containing surface active agent. This is because the compatibility of the surface active agent with the ionizing radiation curable resin 3 becomes worse, so that the surface active agent separates out to leave, on a final product, the traces of coating conducted by using the multiple nozzle. It is noted that Fluorad FC series (manufactured by Sumitomo 3M Limited) having perfluoroalkyl groups, F series (manufactured by Megafack Co., Ltd.), and the like can be used as the fluorine-containing surface active agent.

It is preferable to make the interval between each two nozzles 2a in the multiple nozzle 2, 10 mm or less. This is because, when the interval between each two nozzles 2a in the multiple nozzle 2 is made greater than 10 mm, the lines of the resin applied to the forming die 1 cannot fully spread to the adjacent lines of the resin (see FIG. 2) even if the resin and the forming die 1 form a contact angle of 20° or less due to the action of the fluorine-containing surface active agent. If the next step is conducted under such conditions, bubbles will enter into those areas where the resin has not fully spread. Even in this case, the inclusion of air bubbles can be prevented by excessively coating the ionizing radiation curable resin 3 even if the interval between each two nozzles 2a in the multiple nozzle 2 is greater than 10 mm. However, the excessively coated portion of the ionizing radiation curable resin 3 is wasted, so that such a manner is unfavorable.

Figure 3:
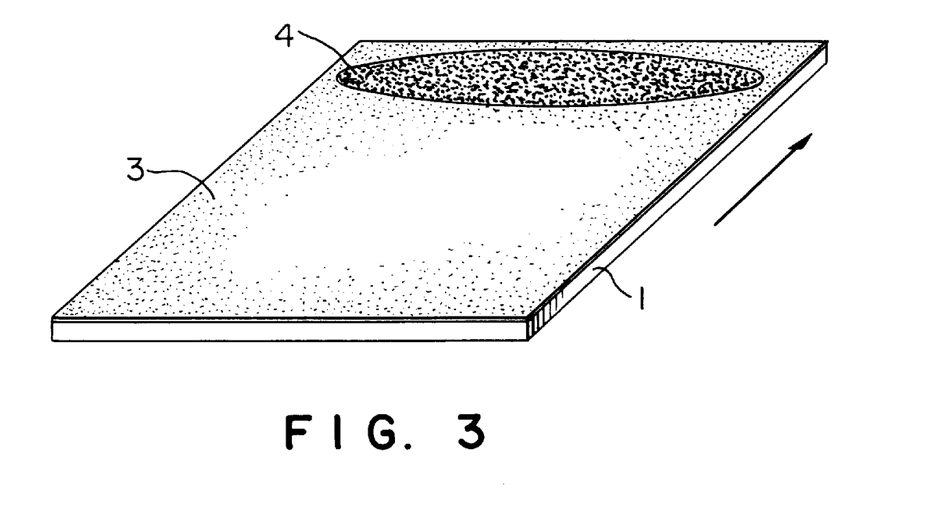
FIG. 3 is an explanatory view of the second step (the step of coating a bank resin) of the process for producing a lens sheet shown in FIG. 1.

Next, the step of coating a bank resin (step 102) shown in FIG. 1 will be explained by referring to FIG. 3. As shown in FIG. 3, the step of coating a bank resin (step 102) is a step in which a resin bank 4 having the same composition as that of the ionizing radiation curable resin 3 is formed at one end of the ionizing radiation curable resin 3 which has been coated onto the forming die 1. The resin bank 4 formed in this step not only forces out those air bubbles that enter between a base material (see symbol 5 in FIG. 4) to be laminated and the forming die 1, but also serves to impart adhesion between the forming die and the base material. The step of coating a bank resin (step 102) can be conducted either before the step of coating a resin by the use of a multiple nozzle (step 101), or concurrently with the same; for example, it is also possible to provide a resin bank 4 at one end of the forming die 1 during the step of coating a resin by the use of a multiple nozzle.

Next, the step of uniform lamination (step 103) and the step of curing the resin (step 104) shown in FIG. 1 will be explained by referring to FIG. 4.

Figure 4:
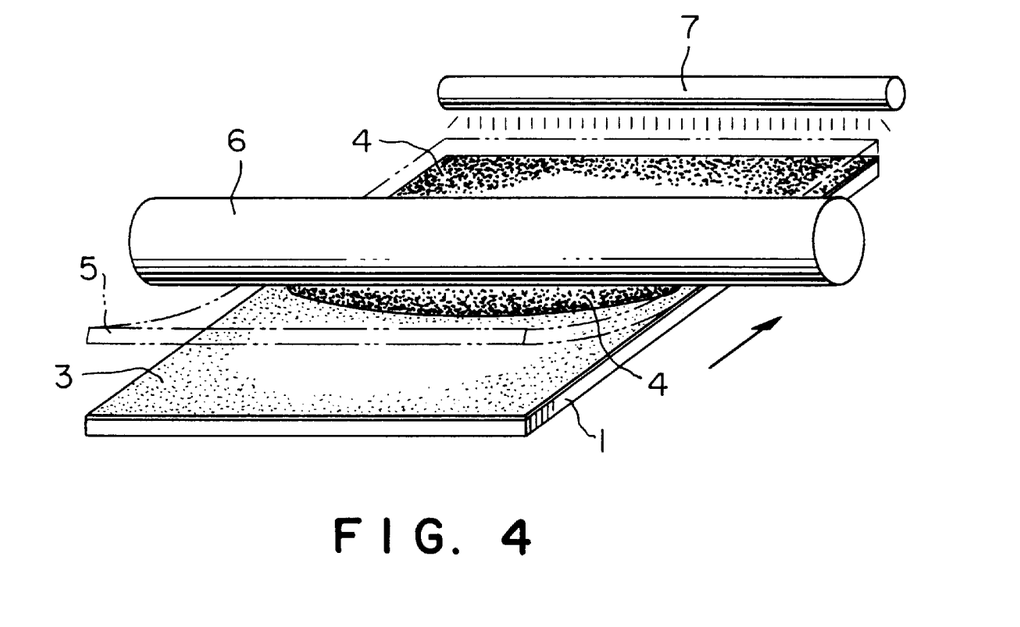
FIG. 4 is an explanatory view of the third and fourth steps (the step of uniform lamination and the step of curing the resin) of the process for producing a lens sheet shown in FIG. 1.

As shown in FIG. 4, the step of uniform lamination (step 103) is a step in which an ionizing-radiation-permeable base material 5 is superposed on the resin bank 4, and the resin bank 4 is uniformly laid over the ionizing radiation curable resin 3 which has been coated, by leveling the resin bank 4 by applying pressure on top of the base material 5 by the use of a pressure roll 6. The direction in which the bank resin 4 is herein leveled by the pressure roll 6 is almost parallel to the direction in which the ionizing radiation curable resin 3 has been coated in the step of coating a resin by the use of a multiple nozzle (step 101). It is noted that this step serves not only to force out those air bubbles which enter between the forming die 1 and the base material 5, but also to make the thickness of the resulting formed product uniform.

It is preferable that the surface of the base material 5 with which the resin bank 4 will be brought into contact be subjected in advance to a treatment such as a primer treatment. By this, it is possible to enhance the adhesion between the resin bank 4 and the base material Next, the step of curing the resin (step 104) is, as shown in FIG. 4, a step in which ionizing radiation is applied to the ionizing radiation curable resins 3,4 through the base material 5 by the use of a light source 7 to cure the resins.

Figure 5:
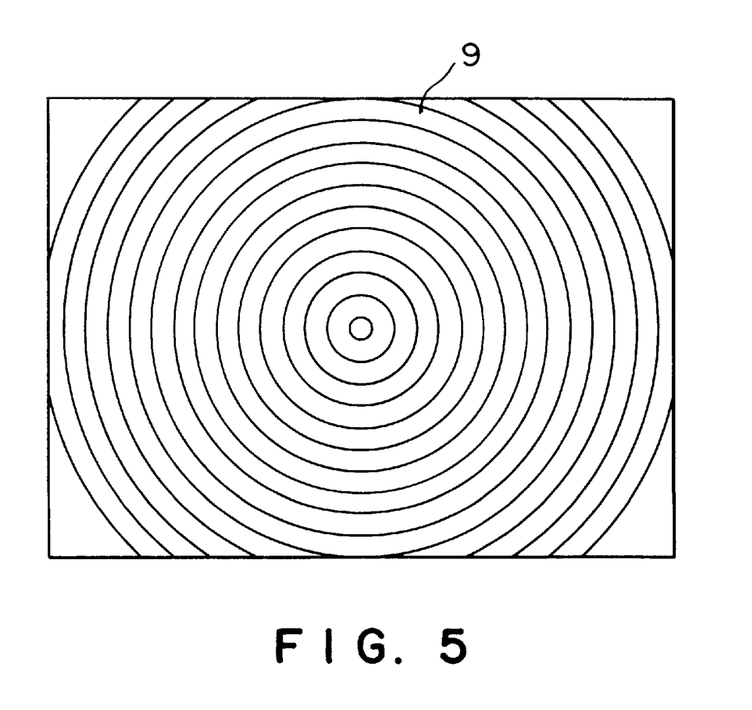
FIG. 5 is an explanatory view of the fifth step (the releasing step) of the process for producing a lens sheet shown in FIG. 1.

Finally, the releasing step (step 105) is a step in which a formed product made from the ionizing radiation curable resins 3,4 is released from the forming die 1 by releasing the press roll to obtain a lens sheet 9 having a lens area on the base material 5 (see FIG. 5).

One embodiment of the process for producing a lens sheet according to the present invention has been explained hereinbefore. Such a process for producing a lens sheet can be effected not only by using a production system provided with a forming die in the shape of a flat plate, but also by using a production system provided with a forming die in the shape of a roll as shown in FIG. 6.

Figure 6:
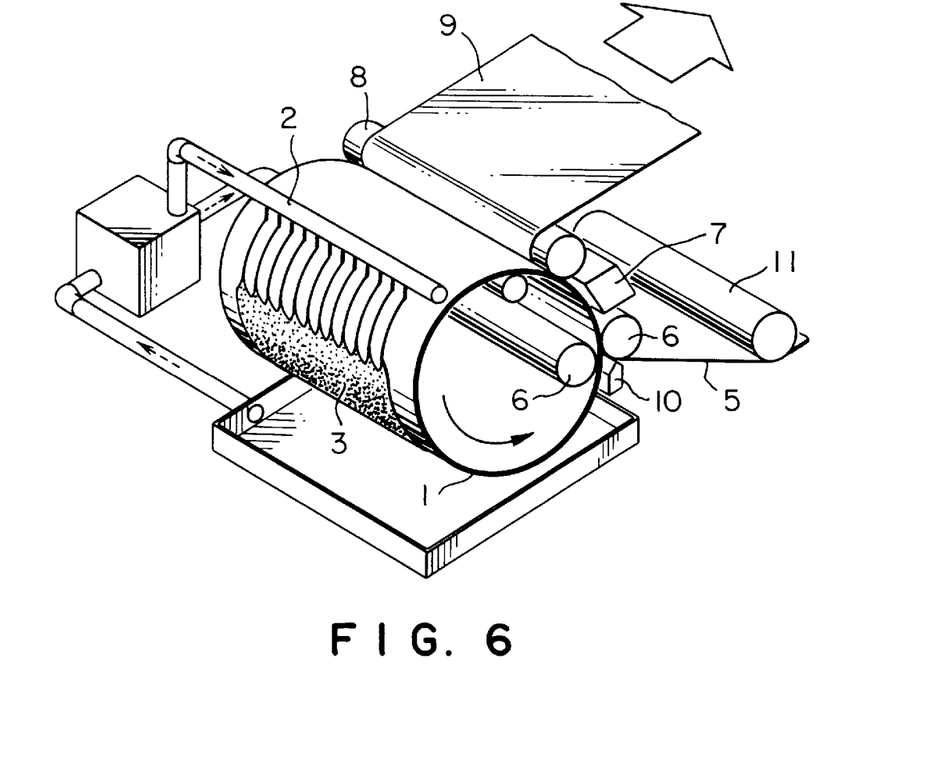
FIG. 6 illustrates one example of the production system that is used for effecting the process for producing a lens sheet shown in FIG. 1.

As shown in FIG. 6, in this production system, the forming die 1 is in the shape of a roll, and an ionizing radiation curable resin 3 applied by a multiple nozzle 2 can be coated onto the entire surface of this forming die 1. Further, an ionizing radiation curable resin (not shown in the figure) having the same composition as that of the ionizing radiation curable resin 3 is coated by a die head 10 onto the ionizing radiation curable resin 3 which has been coated onto the forming die 1. Instead of coating the resin bank 4 by the use of the die head 10, it is possible to coat, by using the multiple nozzle 2, the ionizing radiation curable resin in an amount equal to the amount of the resin bank 4.

Further, a pair of pressure rolls 6,6 are arranged at the upper part of the die head 10 in such a manner that the pressure rolls sandwich the forming die 1 in the shape of a roll from the outside and inside thereof. The base material 5 can thus be continuously fed between the pressure roll 6 (on the surface side) and the forming die 1 via a paper feed roll 11. Further, a light source 7 is further provided at the upper part of the pressure rolls 6,6, so that ionizing radiation can be applied to the ionizing radiation curable resin through the base material 5. A release roll 8 is provided at the upper part of the light source 7, so that a lens sheet 9 having a lens area formed on the base material 5 can be released from the forming die 1.

When a lens sheet is produced by using a production system provided with such a forming die in the shape of a roll, it is preferable to use as the base material 5 a film having a thickness of 0.25 mm or less. This is because, when the thickness of the film is greater than this, it is impossible to feed the film, and to take up the film after forming. Further, it is preferable to use, for example, a highly flexible urethane acrylate resin as the ionizing radiation curable resin serving as the resin composition for a lens sheet. By doing so, when a lens sheet such as a Fresnel lens sheet is continuously released, hang-up of the lens area of the lens sheet by the forming die is not caused, so that a lens sheet having no damage on the lens area thereof can be obtained.

EXAMPLES

Specific examples of the process for producing a lens sheet as shown in FIGS. 1 to 7 will now be given below.

Example 1

First of all, First Example of the process for producing a lens sheet according to the present invention will be given by referring to FIGS. 1 to 5. It is noted that this First Example is to specifically explain the process for producing a circular Fresnel lens sheet by the use of a forming die in the shape of a flat plate.

As shown in FIG. 2, a urethane acrylate ultraviolet light curable resin 3 was coated as the resin composition for a sheet onto the entire surface of the forming die 1 by using a multiple nozzle 2 in which a plurality of nozzles 2a were arranged along the flat-plate-like forming die 1 in the transverse direction thereof. The coating of the ultraviolet light curable resin 3 by the use of the multiple nozzle 2 was conducted by allowing the forming die 1 to move in the direction substantially rectangular to the direction in which the multiple nozzle 2 extended. 150 g of the ultraviolet light curable resin 3 was thus coated onto the entire surface of the forming die 1 (step 101).

As the forming die 1, a flat plate in the shape of a regular square, the one side thereof being 1 m, on which a circular Fresnel lens pattern with a pitch of 0.1 mm had been formed was herein used. Further, the interval between each two nozzles 2a in the multiple nozzle 2 was adjusted to four different values (15 mm, 12 mm, 10 mm, 5 mm) as shown in the following Table 1. Furthermore, a fluorine-containing surface active agent was added to the ultraviolet light curable resin 3 in four different amounts (0.5%, 0.1%, 0.05%, 0%) as shown in Table 1, and, at the same time, the resin composition was so controlled that the refractive index after curing would be 1.55. The values of the contact angle θ shown in the following Table 1 are those ones that were obtained by a measurement carried out 30 seconds after 1 g of the ultraviolet light curing resin 3 was dropped on the central part (the area including no lens pattern) of the forming die 1.

The composition of the ultraviolet light curable resin and that of the fluorine-containing surface active agent added to the ultraviolet light curable resin are as follows:

| Ultraviolet light curable resin (parts by weight) | |
| --- | --- |
| (Acrylic monomer) | |
| Aronix M5700 (manufactured by Toa Gosei Chemical Industry Co., Ltd.) | 40 parts |
| Aronix M101 (manufactured by Toa Gosei Chemical Industry Co., Ltd.) | 10 parts |
| NK Ester A-400 (manufactured by Shin-Nakamura Chemical Co., Ltd.) | 10 parts |
| Aronix M210 (manufactured by Toa Gosei Chemical Industry Co., Ltd.) | 10 parts |
| (Urethane acrylate oligomer) | |
| Urethane acrylate reaction product 1 | 30 parts |
| (Reaction initiator) | |
| Dalocur 1173 (manufactured by CIBA-GEIGY AG) | 2 parts |

Fluorine-containing surface active agent

Fluorad FC-430 (manufactured by Sumitomo 3M Limited)

The above-described urethane acrylate oligomer (unrethane acrylate reaction product 1) is a reaction product (number-average molecular weight: 7480) of an adduct of a diol with 10 mol of bisphenol A ethylene oxide (EO); a polyester polyol composed of maleic anhydride; xylylene diisocyanate; and hydroxyethylacrylate.

TABLE 1

| No. | Nozzle intervals in multi-ple nozzle (mm) | Amount of fluorine-containing surface active agent added (%) | Resin contact angle (° C.) | Inclusion of air bubbles | Separation of fluorine-containing surface acive agent |
| --- | --- | --- | --- | --- | --- |
| 1  | 15 | 0.5  | 17 | x | ○ |
| 2  | 15 | 0.1  | 20 | x | ○ |
| 3  | 15 | 0.05 | 25 | x | ○ |
| 4  | 15 | 0    | 35 | x | ○ |
| 5  | 12 | 0.5  | 17 | x | ○ |
| 6  | 12 | 0.1  | 20 | x | ○ |
| 7  | 12 | 0.05 | 25 | x | ○ |
| 8  | 12 | 0    | 35 | x | ○ |
| 9  | 10 | 1.0  | 17 | ○ | x |
| 10 | 10 | 0.5  | 17 | ○ | ○ |
| 11 | 10 | 0.1  | 20 | ○ | ○ |
| 12 | 10 | 0.05 | 25 | x | ○ |
| 13 | 10 | 0    | 35 | x | ○ |
| 14 | 5  | 1.0  | 17 | ○ | x |
| 15 | 5  | 0.5  | 17 | ○ | ○ |
| 16 | 5  | 0.1  | 20 | ○ | ○ |
| 17 | 5  | 0.05 | 25 | x | ○ |
| 18 | 5  | 0    | 35 | x | ○ |

Next, as shown in FIG. 3, 150 g of a resin bank 4 having the same composition as that of the ultraviolet light curable resin 3 was coated, by the curtain flow coating method, onto the ultraviolet light curable resin 3 which had been coated onto the forming die 1 (step 102). The resin bank 4 was so formed that it would spread, to a width equal to the breadth of the forming die 1, at the front end (in the direction indicated by an arrow) of the forming die 1 in the direction substantially rectangular to the direction in which the forming die would be moved.

After the resin bank 4 was thus formed, a 2.0 mm thick transparent acryl plate (Sumipex HT manufactured by Sumitomo Chemical Co., Ltd.) containing no ultraviolet absorber was superposed as the base material 5 on the resin bank 4 as shown in FIG. 4, and, while rolling a pressure roll 6 at a speed of 1.5 m/min, the forming die 1 was allowed to move forward (in the direction shown by an arrow) to level the resin bank 4, thereby uniformly laying resin bank 4 over the ultraviolet light curable resin 3 which had been coated (step 103).

Next, as shown in FIG. 4, 150 [mJ/cm$^2$] of ultraviolet light was applied by using an ultraviolet light source 7 through the base material 5, thereby curing the ultraviolet light curable resin composition 3 and the ultraviolet light curable resin 4 laid over it (step 104).

Finally, the formed product made from the ultraviolet light curable resins 3,4 was released from the forming die 1 by releasing the pressure roll to obtain a circular Fresnel lens sheet 9 in which a circular Fresnel lens had been formed on the base material 5 (see FIG. 5) (step 105).

The appearance of the circular Fresnel lens sheet 9 thus produced was checked up. As a result, it was found that, when the interval between each two nozzles 2a in the multiple nozzle 2 is 10 mm or less and when the contact angle θ formed by the utraviolet light curable resin 3 and the forming die 1 is 20° or less, an excellent circular Fresnel lens sheet 9 containing no air bubbles can be obtained. Further, it was also found the following: even if the contact angle θ formed by the ultraviolet light curable resin and the forming die 1 is 20° or less, the fluorine-containing surface active agent separates out from the circular Fresnel lens sheet 9 if the amount of the fluorine-containing surface active agent added is 1.0%.

Example 2

Next, Second Example of the process for producing a lens sheet according to the present invention will now be explained by referring to FIGS. 1 to 6. This Second Example is to specifically explain the process for producing a circular Fresnel lens sheet by the use of a forming die in the shape of a roll. The steps comprised in the process using the production system as shown in FIG. 6 will be explained successively from the earliest step.

First of all, a urethane acrylate ultraviolet light curable resin 3 was coated as the resin composition for a sheet onto the entire surface of the forming die 1 by the use of a multiple nozzle 2 in which a plurality of nozzles were arranged along the forming die 1 in the shape of a roll in the transverse direction thereof. The coating of the ultraviolet light curable resin 3 by the use of the multiple nozzle 2 was conducted with rotating the forming die 1, at a rotational speed of 1.5 m/min, in the direction substantially rectangular to the direction in which the multiple nozzle 2 extended. 150 g of the ultraviolet light curable resin 3 was thus coated onto the entire surface of the forming die 1 (step 101).

As the forming die 1, a roll having a breadth of 1 m and a diameter of 0.8 m, whose surface had been provided with a circular Fresnel lens pattern with a pitch of 0.1 mm was herein used. Further, the interval between each two nozzles in the multiple nozzle 2 was adjusted to 5 mm. Furthermore, a fluorine-containing surface active agent was added to the ultraviolet light curable resin 3, and the resin composition was so controlled that the refractive index after curing would be 1.55. It is noted that the contact angle θ formed by the ultraviolet light curable resin 3 and the forming die 1, measured by the same method as in the above Example 1 was found to be 17°.

The composition of the ultraviolet light curable resin and that of the fluorine-containing surface active agent added to the ultraviolet light curable resin were as follows, and experiments were carried out by using two different compositions (Case 1) and (Case 2).

| Ultraviolet light curable resin (parts by weight) | | |
|---|---|---|
| | (Case 1) | (Case 2) |
| (Acrylic monomer) | | |
| Aronix M5700 (manufactured by Toa Gosei Chemical Industry Co., Ltd.) | 25 parts | 40 parts |
| Aronix M10 (manufactured by Toa Gosei Chemical Industry Co., Ltd.) | 15 parts | 10 parts |
| NK Ester A-400 (manufactured by Shin-Nakamura Chemical Co., Ltd.) | 10 parts | 10 parts |
| Aronix M21 (manufactured by Toa Gosei Chemical Industry Co., Ltd.) | — | 10 parts |
| (Urethane acrylate oligomer) | | |
| Urethane acrylate reaction product 2 | 50 parts | 30 parts |
| (Reaction initiator) | | |
| Darocur 1173 (manufactured by CIBA-GEIGY AG) | 2 parts | 2 parts |

| Fluorine-containing surface active agent | | |
|---|---|---|
| Fluorad FC-430 (manufactured by Sumitomo 3M Limited) | 0.5 parts | 0.5 parts |

In the above-described urethane acrylate oligomer (urethane acrylate reaction product 2) is a reaction product (number-average molecular weight: 7000) of an adduct with 5 ml of bisphenol A propylene oxide; a polyester composed of maleic anhydride; xylylene diisocyanate; and 2-hydroxyethylacrylate.

Next, an ultraviolet light curable resin 4 (not shown in the figure) having the same composition as that of the ultraviolet light curable resin 3 was jetted from a die head 10 to the ultraviolet light curable resin 3 which had been coated onto the forming die 1 (die head coating method). 150 g of the ultraviolet light curable resin 4 was thus coated onto the entire surface of the ultraviolet light curable resin 3 in the direction parallel to the direction of the rotation of the forming die 1 (step 102).

Thereafter, a base material 5, a transparent PET film having a thickness of 125 μm and a width of 1200 mm (A-4100 manufactured by Toyobo Co., Ltd.), whose surface had been subjected to a treatment for imparting the property of easily adhering to an adherend, fed via a paper feed roll 11 was superposed on the ultraviolet light curable resin 4 jetted from the die head 10, and the ultraviolet light curable resin was leveled by the pressure rolls 6,6 in the direction parallel to the direction of the rotation of the forming die 1, thereby forming a layer of the ultraviolet light curable resin having a uniform thickness (step 103).

Next, 1500 [(mJ/cm$^2$] of ultraviolet light was applied to the ultraviolet light curable resin 3 and to the ultraviolet light curable resin 4 laid over it, through the base material 5 by the use of an ultraviolet light source 7, thereby curing these resins (step 104).

Finally, the formed product made from the ultraviolet light curable resins 3,4 was released from the forming die 1 by releasing the pressure rolls, by means of a release roll 8 whose temperature had been adjusted to 30° C., thereby obtaining a circular Fresnel lens sheet 9 having a circular Fresnel lens on the base material 5 (step 105).

The circular Fresnel lens sheet thus produced was examined in terms of inclusion of air bubbles and of damages on the lens area caused by reverse release. As a result, it was found that an excellent circular Fresnel lens sheet containing no air bubbles, having no damages on the lens can be obtained.

TABLE 2

| | Inclusion of Air Bubbles | Damages on Lens |
|---|---|---|
| Case 1 | 0 | 0 |
| Case 2 | ○ | ○ |

We claim:

1. A process for producing a lens sheet, comprising the steps of:

coating a resin composition for a lens sheet, said resin composition containing a fluorine-containing surface active agent, onto a forming die for a lens sheet by the use of a multiple nozzle in which a plurality of nozzles is arranged at intervals along the forming die in a direction substantially rectangular to a direction in which the resin composition for a lens sheet will be coated; and superposing a base material on the resin composition for a lens sheet that has been coated onto the forming die wherein said fluorine-containing surface active agent is present in an amount such that the resin composition forms a contact angle of 20° or less with the forming die when the resin composition is coated onto the forming die.

2. A process for producing a lens sheet, comprising the steps of:

coating a resin composition for a lens sheet, said resin composition containing a fluorine-containing surface active agent, onto a forming die for a lens sheet by the use of a multiple nozzle in which a plurality of nozzles is arranged at intervals along the forming die in a direction substantially rectangular to a direction in which the resin composition for a lens sheet will be coated;

forming a resin bank having the same composition as that of the resin composition for a lens sheet;

superposing a base material on the resin bank; and uniformly laying the resin bank over the resin composition for a lens sheet that has been coated previously, by leveling the resin bank by applying pressure on top of the base material by the use of a pressure roll wherein said fluorine-containing surface active agent is present in an amount such that the resin composition forms a contact angle of 20° or less with the forming die when the resin composition is coated onto the forming die.

3. The process for producing a lens sheet according to claim 1, wherein the forming die is in the shape of a roll and that the base material is continuously fed to the forming die.

4. The process for producing a lens sheet according to claim 1, wherein the resin composition for a lens sheet comprises an ionizing radiation curable resin and the base material has transparency or light-diffusivity so that ionizing radiation can pass through it.

5. The process for producing a lens sheet according to claim 1, wherein the nozzles in the multiple nozzle are arranged at intervals of 10 mm or less.

6. The process of claim 1, wherein said surface active agent is present in an amount of 0.1 to 0.5 wt. % of the resin.

7. The process of claim 2, wherein said surface active agent is present in an amount of 0.1 to 0.5 wt % of the resin.

* * * * *